INVENTOR
KENJIRO TAKAYANAGI
BY [signature]
Atty.

INVENTOR
KENJIRO TAKAYANAGI
BY Louis Bernat
Atty.

Oct. 31, 1967 KENJIRO TAKAYANAGI 3,350,504

FREQUENCY MODULATED MAGNETIC RECORDING AND REPRODUCING SYSTEM

Filed Aug. 10, 1964

8 Sheets-Sheet 3

INVENTOR
KENJIRO TAKAYANAGI

BY Louis Bernat

Atty.

INVENTOR
KENJIRO TAKAYANAGI

BY Louis Bernat

Atty.

INVENTOR
KENJIRO TAKAYANAGI
BY Louis Bauer
Atty.

Oct. 31, 1967 KENJIRO TAKAYANAGI 3,350,504

FREQUENCY MODULATED MAGNETIC RECORDING AND REPRODUCING SYSTEM

Filed Aug. 10, 1964

8 Sheets-Sheet 6

INVENTOR
KENJIRO TAKAYANAGI

BY

Louis Bernat

Atty.

INVENTOR
KENJIRO TAKAYANAGI

BY

Atty.

INVENTOR
KENJIRO TAKAYANAGI
BY
Louis Bernat
Atty.

United States Patent Office 3,350,504
Patented Oct. 31, 1967

3,350,504

FREQUENCY MODULATED MAGNETIC RECORDING AND REPRODUCING SYSTEM

Kenjiro Takayanagi, Kanagawa-ku, Yokohama, Japan, assignor to Victor Company of Japan, Limited, a corporation of Japan Filed Aug. 10, 1964, Ser. No. 388,611
12 Claims. (Cl. 178—6.6)

This invention relates to a magnetic recording and reproducing system and more particularly to a system for recording and reproducing video or other wide band signals, with high fidelity, minimum amplitude and phase distortion, and excellent signal-to-noise ratio, without generating undesirable beat or other extraneous signals, and without requiring increased band width requirements in the recording system. The system utilizes highly reliable circuitry which is readily constrructed, does not require critical adjustment, and utilizes a minimum number of components.

This application is a continuation-in-part of my copending application entitled "Magnetic Recording and Reproducing System," filed April 23, 1962. Serial No. 189,498, Patent No. 3,230,306, issued January 18, 1966. As disclosed in said application, a frequency modulation system had theretofore been used wherein the center frequency of a frequency modulated signal was set above the maximum modulating or input frequency and also close to the upper limit of the frequency range of the recording and reproducing range, the upper side band being attenuated so as to essentially utilize only the lower side band.

In such a system, a video signal may be applied to a reactance tube to modulate the frequency of an oscillator operated at a mean or center frequency which is relatively high and the frequency modulated output of the oscillator may be applied through a buffer amplifier to a mixer connected to a local oscillator operated at a different frequency, with the output of the mixer being applied through amplifiers to a recorder. In reproducing, the signal is applied from the reproducer through amplifier and switching circuits to a limiter and thence to a mixer connected to an oscillator operated at a relatively high frequency. The output of the mixer is applied through a tuned IF amplifier to a discriminator to develop a signal which is applied through an amplifier to develop a final output signal.

By way of example, in a system in which the recording and reproducing frequency range falls off rapidly above 4 mc., the main oscillator of the recording system may be operated at a center frequency of 45 mc. and the local oscillator may be operated at 41 mc. to set the center frequency of the recorded frequency modulated carrier at 4 mc. With such a system, a maximum modulating or input frequency of 3 mc. may be recorded. In prior systems of this type in which the fall-off of the recording and reproducing frequency range is reached at a higher frequency, the center frequency of the frequency modulated carrier is set at 5 or 6 mc., to permit recording of a maximum modulated frequency on the order of 4 mc.

Such prior art systems have advantages over recording and reproducing systems in which a signal is directly recorded and reproduced without conversion to a frequency modulated signal, in reducing the effect of amplitude variations and extraneous noise signals. However, the highest input frequency to be recorded and reproduced must be substantially less than the lower limit of the deviation of the frequency modulated signal to avoid the production of undesirable beat components which produce stripes, dots or the like in a reproduced television picture. This problem is particularly acute in recording color television signals wherein the chrominance signal sub-carrier of 3.58 mc. is strong. If the center frequency of the frequency modulated signal is 6 mc., for example, a component at 2.42 mc. (6 mc. minus 3.58 mc.) may be reproduced to cause distortion of the picture.

In an attempt to increase the highest input frequency to be recorded and reproduced and to minimize the generation of such beat signal components, the center frequency of the frequency modulated carrier may be made equal to the highest frequency which may be effectively recorded and reproduced in the system, and the maximum deviation of the frequency modulated carrier may be set at a small value. However, it is found that the signal-to-noise ratio of the signal is then greatly reduced. Accordingly, values must be chosen to compromise between lowering the limit of the highest input signal frequency to be recorded and reproduced or increasing the generation of beat signal components, on the one hand, and decreasing the signal-to-noise ratio of the system, on the other hand. As a result, the ratio of the frequency deviation of the carrier to the center frequency of the carrier has been equal to about 0.2 or less in prior systems.

According to this invention, a frequency modulation system is used wherein the frequency of a carrier is varied between lower and upper frequency limits corresponding to amplitude limits of an input signal, and wherein the lower frequency limit is equal to or less than the maximum frequency of the input signal. The signal thus produced is recorded to be subsequently reproduced and applied to a discriminator operative to produce an output signal corresponding to the original input signal. Preferably, the center frequency of the frequency modulated carrier is less than the maximum frequency of the input signal. With this system, amplitude and phase distortions are minimized. In addition, the center frequency of the frequency modulated carrier may be less than the maximum frequency which may be recorded and reproduced, and the upper side band of the frequency deviation can thereby be transmitted. It is found that the beat signal components are then substantially eliminated. Further, the deviation of the frequency modulated carrier can be made greater and a correspondingly higher signal-to-noise ratio can be obtained. At the same time, an input signal having a relatively high maximum frequency can be accurately reproduced.

According to an important feature and object of the invention, the upper limit of frequency deviation of the carrier is less than the maximum frequency which can be recorded and reproduced to insure reproduction of the entire upper side band of the frequency deviation, to further minimize the production of beat components and to effect the reproduction of higher frequency components with minimum phase and amplitude distortions.

Another important feature of the invention relates to the use of heterodyne means for producing the frequency modulated signal for recording. In accordance with this feature, a signal at a relatively high frequency (48 mc. for example) is frequency modulated by an input signal and is applied to a mixer along with a fixed frequency signal at a different frequency (51 mc. for example) to produce a frequency modulated signal for recording, the center frequency of the recorded signal (3 mc. for example) being equal to the difference between the center frequency of the modulated signal and the frequency of the fixed frequency signal.

A further feature of the invention relates to the use of heterodyne means in the reproducing portion of the system. In particular, the reproduced frequency modulated signal is applied to a mixer along with a signal at a relatively high fixed frequency and the output of the mixer is applied to a filter to remove frequency components either above or below the fixed frequency. The output of the filter is then applied through a limiter to a discriminator to produce a final output signal which may be applied through an amplifier to a television picture tube or other utilization means.

A specific feature of the invention relates to the suppression of undesired signal components which might otherwise be recorded with the lower frequency limit of the recorded frequency modulated signal being less than the maximum frequency of the input signal.

In one embodiment of the invention, the modulated high frequency signal is filtered before application to the mixer to remove frequency components beyond the frequency of the fixed frequency signal applied to the mixer. Thus with a fixed frequency higher than the frequency of the modulated signal, the filter removes frequency components above a frequency equal to or less than the fixed frequency. With a fixed frequency less than the frequency of the modulated signal, the filter removes frequency components below a frequency equal to or greater than the fixed frequency. In either case, the filter removes frequency components beyond the frequency of the fixed frequency signal, and undesired signal components are not recorded.

In another embodiment of the invention, the modulated signal is applied to the mixer without filtering and a high pass filter is provided following the output of the mixer for removing the undesired components.

The features thus far discussed, and other features of the invention are disclosed in my aforesaid copending application.

Another important feature of the invention relates to the recording of television signals having periodic horizontal synchronizing signals wherein means responsive to such signals are provided for accurately fixed one limit of the frequency deviation of the modulated signal relative to the levels of frequency deviation caused by the video signal information transmitted between the synchronizing signals. Preferably, the lower frequency limit of the recorded signal is fixed in response to the synchronizing signals.

A still further feature of the invention relates to a modified circuit for the reproducing portion of the system, and particularly to a discriminator circuit operative to directly produce an output signal from the reproduced signal without frequency conversion and in a highly accurate and efficient manner.

Still further features of the invention relate to specific circuit arrangements for performing the required functions in a highly reliable manner and with a minimum number of component elements.

This invention contemplates other and more specific objects, features and advantages which will become more fully apparent from the following detailed description taken in conjunction with the accompanying drawings which illustrate preferred embodiments and in which.

Figures 1, 2, 3, 4, 5, 6:
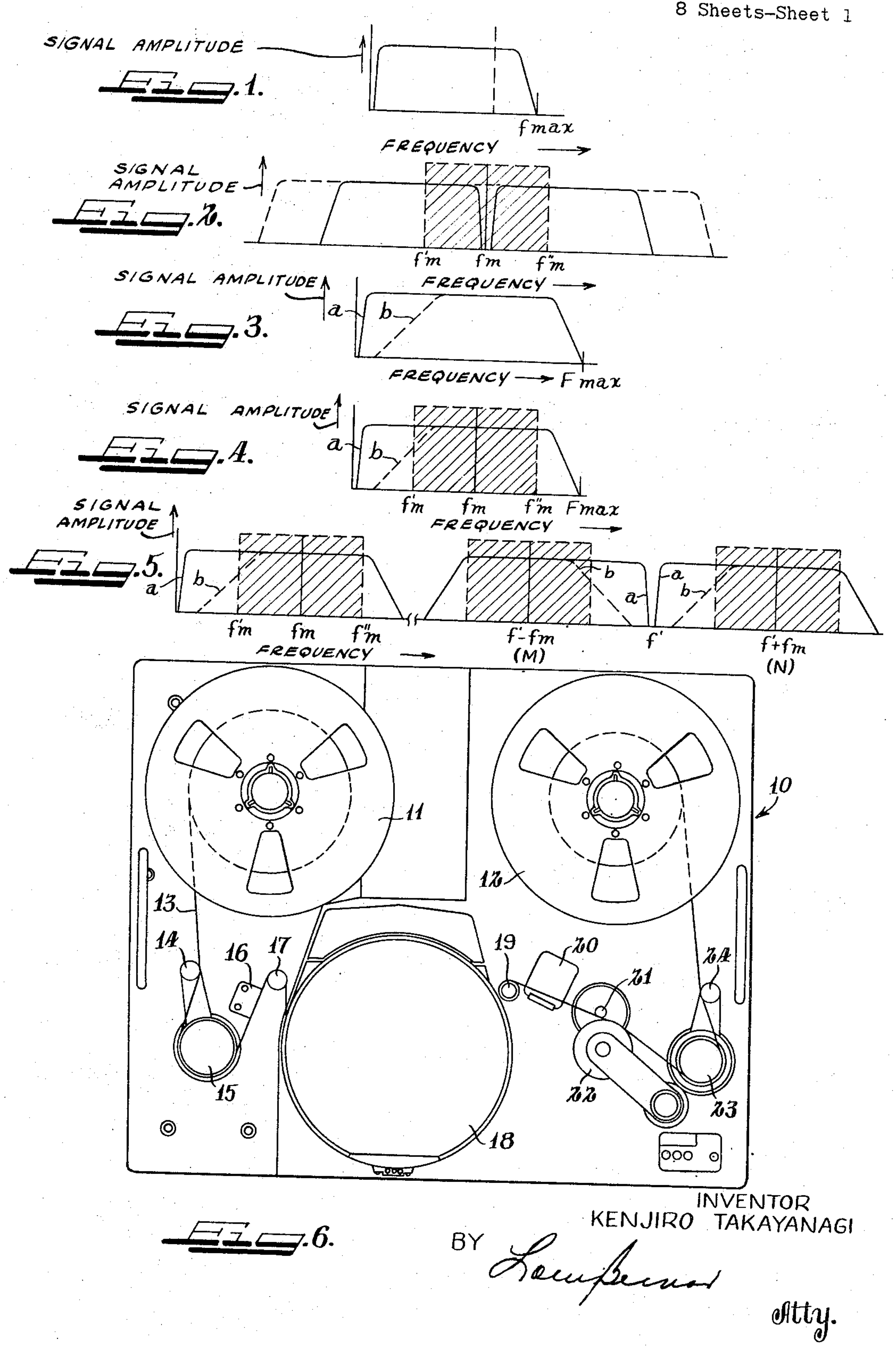
FIGURE 1 shows the spectrum of an input signal to be recorded and reproduced with the system of this invention.
FIGURE 2 shows the spectrum of a signal produced by modulation of the frequency of a carrier by an input signal as detected in FIGURE 1.
FIGURE 3 shows the overall frequency response characteristics of a recorder and reproducer used in the system of this invention.
FIGURE 4 shows the spectrum of the signal resulting from the application of a portion of the frequency modulated signal as shown in FIGURE 2 through a recorder and reproducer having a response characteristic as illustrated in FIGURE 3.
FIGURE 5 shows the same spectrum as shown in FIGURE 4 and also the spectrum of a signal produced by heterodyne conversion of the signal of FIGURE 4 to a higher frequency range.
FIGURE 6 is a plan view of a magnetic recording and reproducing apparatus usable in a system constructed according to the invention.

FIGURES 1–5 graphically illustrate the frequency spectrums or frequency response characteristics of signals or circuits, for the purpose of explaining basic principles of the invention. FIGURE 1 shows the frequency spectrum of an input signal such as a television video signal which may be recorded and reproduced with the system of this invention, having a maximum frequency $f_{max}$. FIGURE 2 shows the spectrum of a signal produced by modulation of the frequency of a carrier by an input signal such as shown in FIGURE 1, the carrier having a mean or center frequency $f_m$. The spectrum of mean frequency components is indicated in full lines and the spectrum of additional lower and higher frequency components is indicated in dotted lines. The range of deviation of the frequency of the carrier from a lower frequency limit $f'_m$ to a higher frequency limit $f''_m$ is shown with a dotted line and hatching.

FIGURE 3 shows the overall frequency response characteristics of a transmission channel such as a magnetic tape recorder and reproducing combination, having the maximum transmission frequency $F_{max}$. The channel may have a characteristic such as to uniformly transmit lower frequency components down to a quite low frequency as indicated by line *a*, or may have a gradual drop-off at the lower frequency end as indicated by dotted line *b*.

According to this invention, a frequency modulated signal such as depicted in FIGURE 2 is applied to a channel having a response characteristic such as shown in FIGURE 3 to produce a resultant signal as shown in FIGURE 4. The lower frequency limit $f'_m$ of the frequency deviation should be equal to or less than the maximum frequency $f_{max}$ of the input signal, and preferably the center frequency $f_m$ of the frequency modulated signal is less than the maximum frequency $f_{max}$ of the input signal, as illustrated. It is also very desirable that the upper side band of the frequency deviation be transmitted, and as illustrated, the upper frequency limit $f''_m$ of the frequency deviation is substantially less than the maximum frequency $F_{max}$ of the transmission channel. It is further noted that the frequency deviation of the carrier is quite large in relation to the center frequency of the carrier, which permits attainment of a high signal-to-noise ratio. The difference between the lower and upper frequency limits $f'_m$ and $f''_m$ is at least nearly to one-half the maximum frequency $F_m$ of the transmission channel. This is particularly desirable when the transmission channel may contain non-linear circuits or elements as is often the case in magnetic recording and reproducing apparatus.

It is noted that a frequency of zero may be represented by the vertical lines defining the left edges of each of FIGURES 1, 3 and 4, which is higher or to the right with respect to a left-hand portion of the spectrum illustrated in FIGURE 2, so that a portion thereof would appear to represent a negative frequency. As clarified hereinafter, however, the signal applied to the recorder-reproducer transmission channel is either so generated that such a portion does not exist or it may exist in a folded-back relationship and may be filtered out.

For reproduction, the output of the recorder-reproducer transmission channel, as shown in FIGURE 4 and at the left in FIGURE 5, may be applied to a mixer along with a signal having a fixed frequency $f'$, to produce a lower side band frequency modulated signal M having a center frequency $f'-f_m$ and an upper side band frequency modulated signal N having the center frequency $f'+f_m$. One of such side bands may be filtered out, and preferably also the frequency $f'$, and the resultant signal containing only the other side band may then be applied to a discriminator to produce a final output signal corresponding to the original input signal.

With a system using the features as thus far described, beat signal and other extraneous signal components are substantially eliminated and an input signal having a high maximum frequency may be reproduced with minimum amplitude and phase distortion. In addition, with a relatively high frequency deviation which is possible with the system, a high signal-to-noise ratio is possible.

Figure 7:
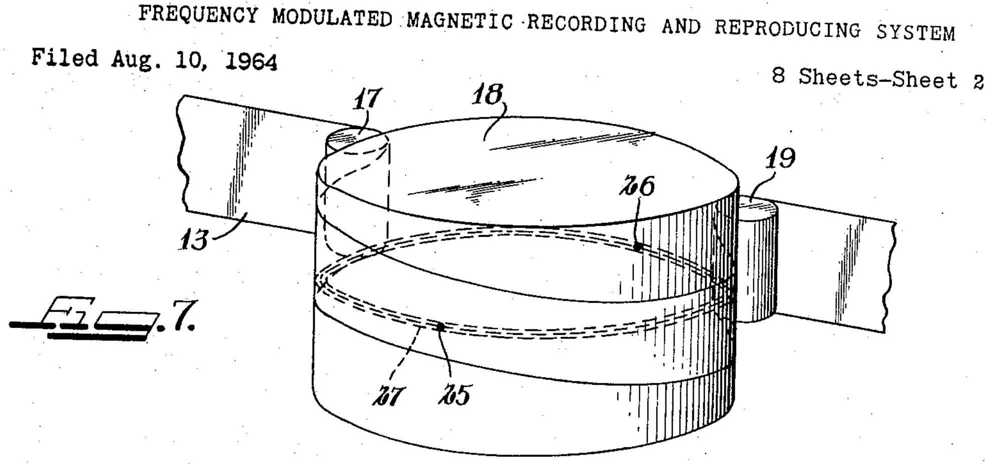
FIGURE 7 is an enlarged schematic perspective view showing a guide drum of the apparatus of FIGURE 6.

FIGURES 6 and 7 illustrate the construction of a magnetic tape recorder and reproducer 10 usable in a system constructed according to this invention. The recorder-reproducer 10 comprises supply and take-up reels 11 and 12 rotatable on spaced vertical axes, the supply reel 11 being higher than the take-up reel 12. A magnetic tape 13 travels from the supply reel 11 over a tension arm device 14 and thence about a flanged roller 15. The tape 13 travels from the roller 15 past a vacuum controller device 16, arranged to hold the tape 13 thereagainst and thereby provide suitable tension. The tape 13 then travels about an idler roller 17 to a guide drum 18, incorporating a video signal recording and reproducing head assembly as described hereinafter. The tape travels from the guide drum 18 about an idler roller 19, and thence past a magnetic head assembly 20 which may record or erase an audio or control signal. The tape then travels past a capstan 21, against which it is held by a pinch roller 22, and thence about a flanged roller 23, and past a tension arm device 24 to the take-up reel 12.

As shown in FIGURE 7, the tape 13 extends in a "U" about approximately half the periphery of the guide drum 18 and in a helical path, with the longitudinal axis of the tape being inclined with respect to the plane of rotation of a pair of magnetic heads mounted in diametrically opposed positions and rotatable at high speed within the drum 18. The magnetic heads 25 and 26 operate alternately to record along tracks oblique to the tape. As diagrammatically illustrated, the heads 25 and 26 are mounted in 180 degree spaced relation on the periphery of a disk 27, rotated at high speed within the drum 18.

Figure 8:
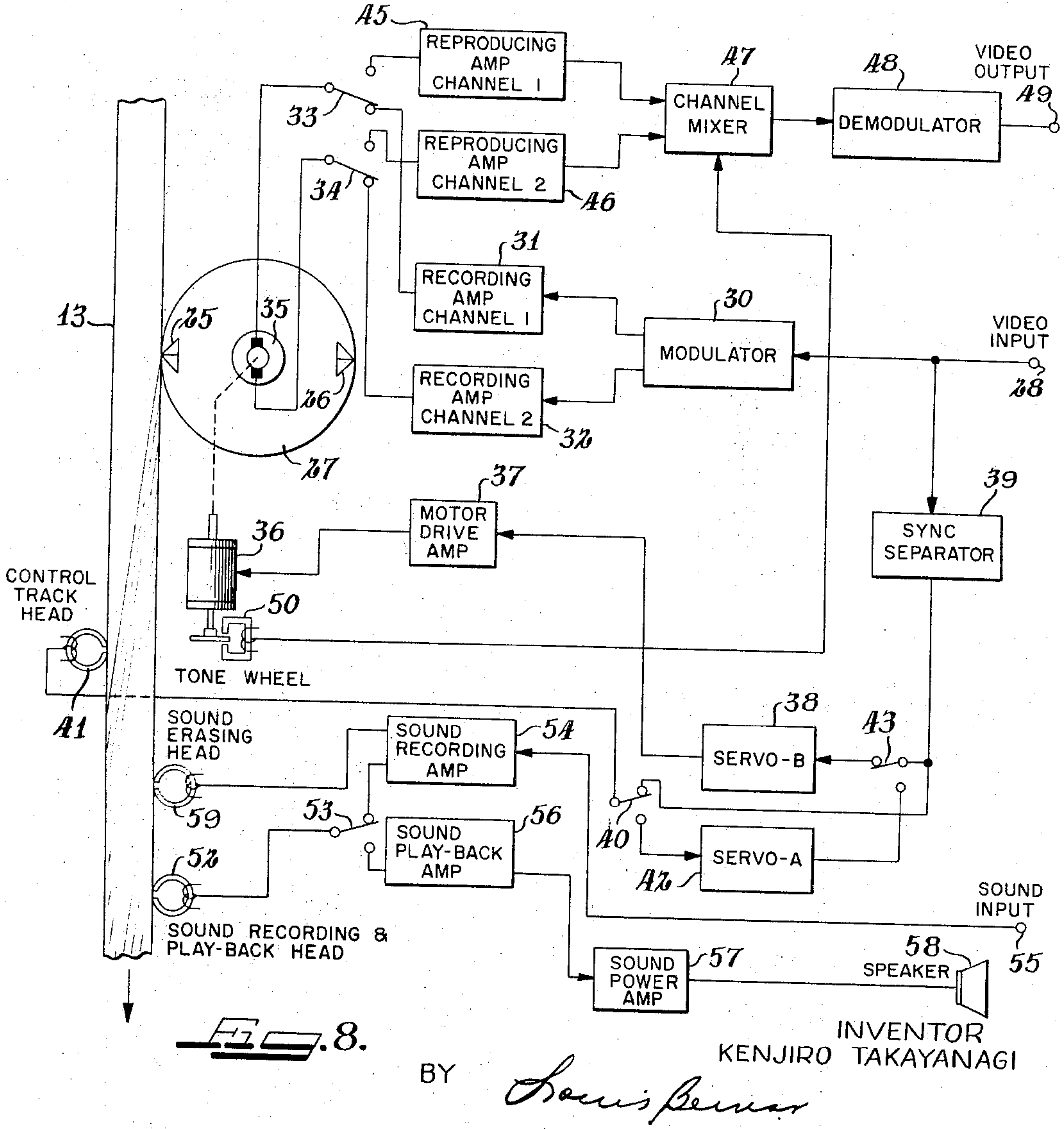
FIGURE 8 is a schematic block diagram of a complete recording and reproducing system constructed according to the invention.

Referring now to FIGURE 8, television video signals to be recorded are applied to an input terminal 28 connected to the input of a modulator 30 having a pair of outputs connected to the inputs of a pair of recording amplifiers 31 and 32. Outputs of the amplifiers 31 and 32 are connectable through selector switch contacts 33 and 34 to brushes of a slip ring device 35, to be connected to the heads 25 and 26.

The disk 27 is rotated by a motor 36 connected to the output of a motor drive amplifier 37 having an input connected to the output of a servo circuit 38. The input of the servo circuit 38 is connected through selector switch contact 43 to the output of a synchronizing signal separator circuit 39 having an input connected to the terminal 28. This arrangement serves to drive the disk 27 in synchronism with synchronizing signals of the video input signal.

The output of the synchronizing signal separator circuit 39 is also connectable through a selector switch contact 40 to a head 41 which serves to record synchronizing signals on the edge of the tape 13, for use in the reproducing operation. In the reproducing operation, the head 41 is connected through the selector switch contact 40 to the input of a servo amplifier 42 having an output connectable through a selector switch contact 43 to the input of the servo circuit 38.

In the reproducing operation, the heads 25 and 26 are connected through the slip ring device 35 and through the selector switch contacts 33 and 34 to the inputs of a pair of reproducing amplifier circuits 45 and 46 having outputs connected to inputs of a channel mixer circuit 47. The output of the mixer circuit 47 is applied to the input of a demodulator circuit 48 having an output connected to an output terminal 49. The mixer circuit 47 is controlled in response to a signal applied thereto from a tone wheel device 50 operated by the motor 36, in a manner to so join the signals produced by the two heads as to form one continuous signal.

As also illustrated in FIGURE 8, a sound recording and playback head 52 is connectable through a selector switch contact 53 either to the output of a recording amplifier 54 having an input connected to a sound input terminal 55, or to the input of a sound playback amplifier 56 having an output connected through a sound power amplifier 57 to a speaker 58. In the recording operation, an erasing head 59 is energized from the sound recording amplifier 54, to erase the sound track ahead of the recording head 52.

Figure 9:
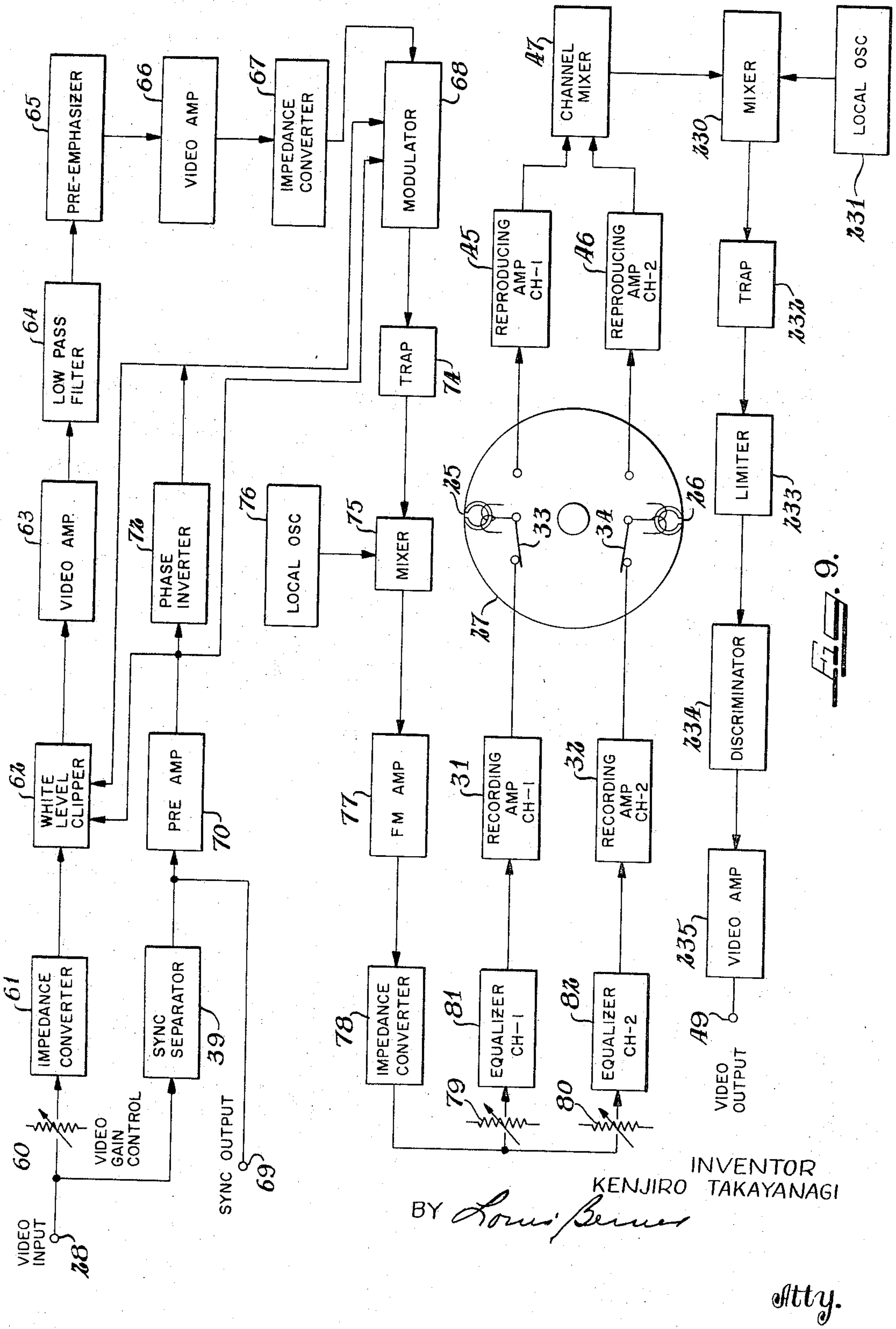
FIGURE 9 is a schematic block diagram of modulating and demodulating portions of the system of FIGURE 8.

FIGURE 9 is a schematic block diagram illustrating modulating and demodulating portions of the system of FIGURE 8. The television video input signal from terminal 28 is applied through a gain control 60 to an impedance converter 61, preferably an emitter-follower circuit, and the output of the impedance converter 61 is applied to the input of a white level clipper 62 which functions to limit and fix the frequency deviation during synchronizing pulse intervals, as clarified hereinafter. The output of the white level clipper 62 is applied to the input of a video amplifier 63, the output of which is applied through a low pass filter 64 to a pre-emphasizer circuit 65. The output of the pre-emphasizer circuit 65 is applied through a video amplifier 66 to an impedance converter 67, the output of the impedance converter 67 being applied to a modulator 68.

The video input signal from terminal 28 is also applied to the synchronizing signal separator circuit 39, as described above, and the output thereof is applied to a terminal 69 for connection to the servo circuit 38 and control track recording head 41. The output of the synchronizing signal separator circuit 39 is additionally applied to the input of a pre-amplifier 70 the output of which is applied to the white level clipper circuit 62, to the modulator 68 and to an input of the phase inverter circuit 72. The output of the phase inverter 72 is applied to the white level clipper circuit 62 and also to the modulator 68.

Figure 11:
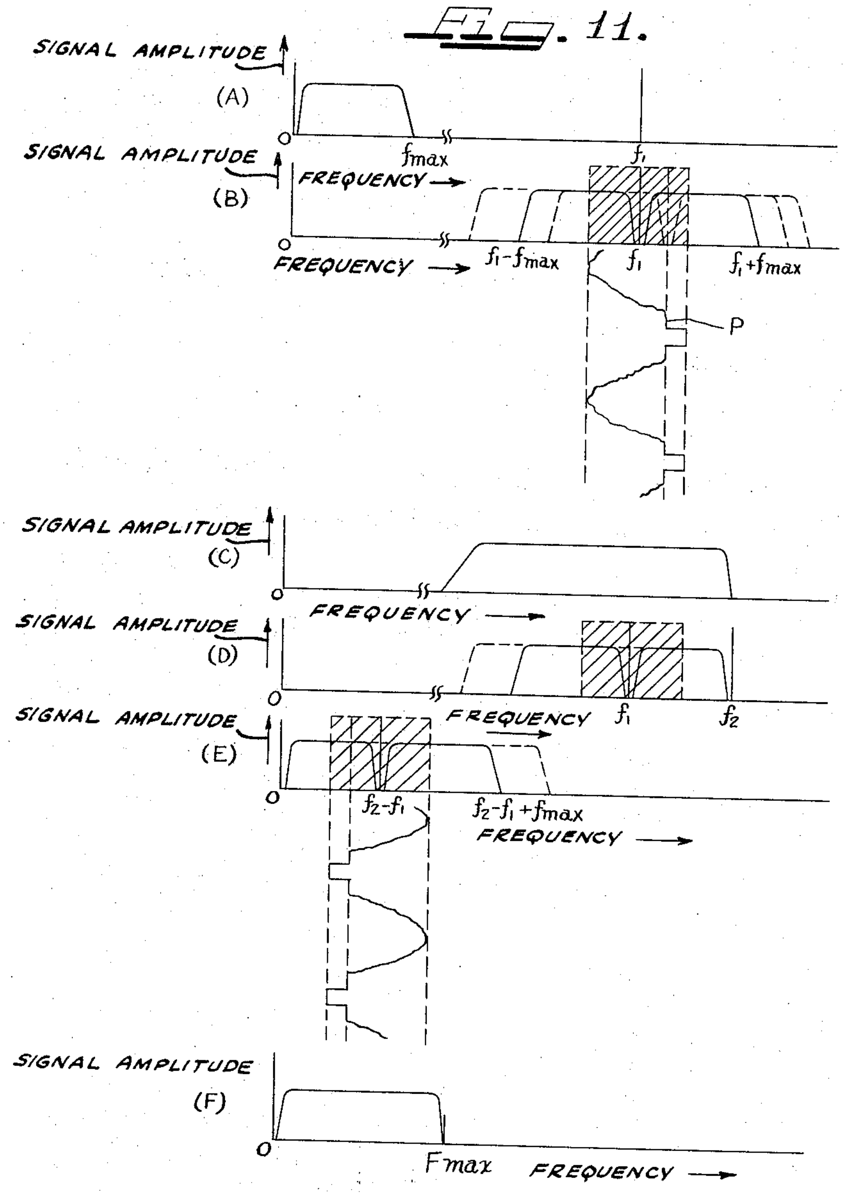
FIGURE 11 illustrates frequency spectrum and frequency response characteristics of signals and circuits of the modulating portion of the system.

The modulator 68 functions to develop a signal which is modulated in frequency between lower and upper frequency limits respectively corresponding to amplitude limits of the input video signal. FIGURE 11(A) shows the frequency spectrum of an input signal, having a maximum frequency $f_{max}$. FIGURE 11(B) shows the frequency spectrum of the output of modulator 68, wherein the spectrum of the main frequency components is indicated in full lines, with a lower side band extending from a frequency of $f_1-f_{max}$ to a frequency slightly lower than $f_1$, and with an upper side band extending from a frequency slightly larger than $f_1$ to a frequency of $f_1+f_{max}$. The frequency $f_1$ is a carrier frequency which may be on the order of 48 mc., by way of example. Additional lower and higher frequency components may be generated also, as indicated in dotted lines. The deviation of the carrier frequency is indicated by the dotted line hatched portion, and the form of the video signal producing such frequency deviations is indicated below FIGURE 11(B), with a vertically extending time base. It is noted that the video signal includes a blanking pedestal P, with synchronizing pulses thereon, and the upper limit of the frequency deviation corresponds to the maximum amplitude of the synchronizing pulses, and is fixed at a certain level. This is accomplished through the operation of the white level clipper circuit 62 and circuitry within the modulator 68, as described hereinbelow.

The signal so generated by the modulator 68 is applied to a trap circuit 74 having a frequency response characteristic such as shown in FIGURE 11(C), and the output of the trap circuit 74 is applied to a mixer 75 along with a fixed frequency signal generated by a local oscillator 76. In FIGURE 11(C), the ordinate is the signal amplitude produced from the output of the trap circuit 74 with a constant amplitude input signal applied over a range of frequencies. The abscissa is frequency and it is noted that FIGURES 11(A), (B), (C), and (D) have the same frequency scale. The output of the mixer 75 is applied through an amplifier 77 to an impedance converter 78, preferably an emitter-follower, with the output of the impedance converter 78 being applied through gain adjustment controls 79 and 80 and through equalizer circuits 81 and 82 to the recording amplifiers 31 and 32.

FIGURE 11(D) shows the frequency spectrum of signals applied to the mixer, including the signal at a fixed frequency $f_2$ generated by the local oscillator 76 and lower frequency portions of the output of the modulator 68. By way of example, the fixed frequency $f_2$ may be on the order of 51 mc. As graphically illustrated in FIGURE 11(C), the trap circuit 74 has characteristics such as to remove frequency components above a frequency which is slightly less than the frequency $f_2$ at which the oscillator 76 is operated.

With such signals applied to the mixer, output signals are developed at frequencies equal to the difference between frequencies applied thereto and also at frequencies equal to the sum of frequencies applied thereto. In the illustrated system, the higher frequencies are filtered out in the amplifier circuit 77, so that only the difference frequencies are utilized. The utilized output signal thus has a form as illustrated in FIGURE 11(E). With frequencies $f_1$ and $f_2$ of 48 mc. and 51 mc., the frequency $f_2-f_1$ is equal to 3 mc. It will be noted that since the fixed frequency $f_2$ is greater than the center frequency $f_1$ of the frequency modulated signal, the relationship of frequency components is reversed. Thus the lower limit of the frequency deviation in the signal as represented by FIGURE 11(E) corresponds to the synchronizing pulses.

The signal output of the amplifier 77 is applied through the impedance converter 78, the gain controls 79 and 80, the equalizers 81 and 82 and the recording amplifiers 31 and 32 to the recording heads 25 and 26, to be subsequently reproduced by the heads 25 and 26 and applied to the reproducing amplifiers 45 and 46. The overall frequency response characteristics of the recorder-reproducer transmission channel is shown in FIGURE 11(F).

As indicated above, by way of illustrative example, and not by way of limitation, the center frequency $f_1$ of the frequency modulated signal developed by the modulator 68 may be 48 mc., and the fixed frequency $f_2$ may be 51 mc., so that the center frequency of the signal applied to the recorder and reproduced channel $(f_2-f_1)$ is 3 mc.

It is noteworthy that if the trap circuit 74 were not provided, there would be applied to the mixer 75 a signal having frequency components higher than $f_2$ which would produce beat components in the output signal interfering with the signals produced by frequencies lower than $f_2$. Such interference signals are thus eliminated by the trap circuit 74 which removes frequency components higher than a frequency less than the fixed frequency $f_2$. It should further be noted that the fixed frequency $f_2$ could be less than the center frequency $f_1$ of the frequency modulated signals. In this case, the trap circuit should remove frequency components less than a frequency higher than the fixed frequency $f_2$. In this case, also, the polarity of the modulating signal should be reversed to cause the lower limit of the frequency deviation to correspond to the synchronizing pulses.

Figure 10:
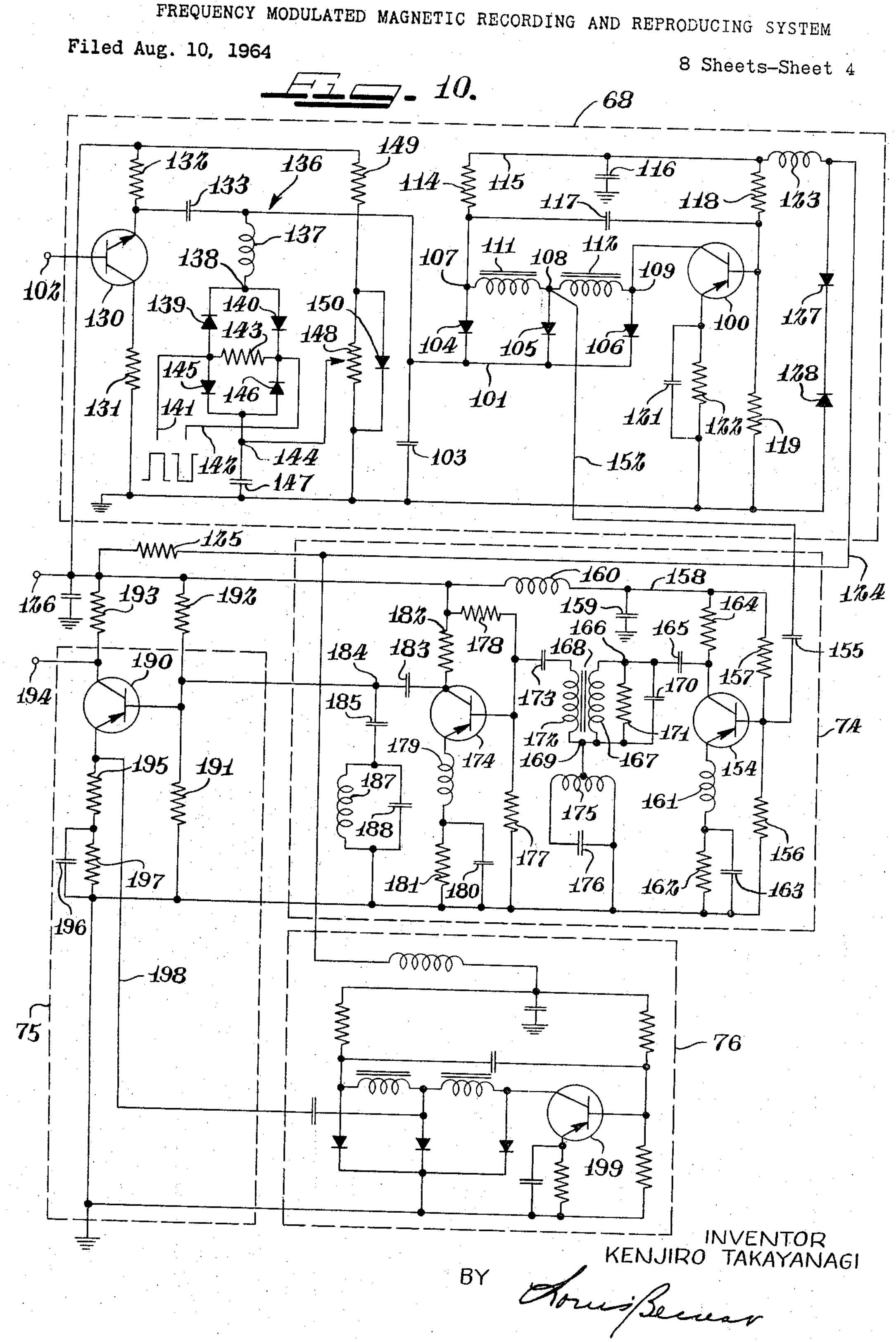
FIGURE 10 is a circuit diagram of frequency modulating and heterodyne circuits of the modulating portion of the system.

FIGURE 10 shows the circuits of the modulator 68, the trap circuit 74, the mixer 75 and the local oscillator 76.

The modulator 68 comprises a transistor 100 operable in a variable frequency oscillation circuit, the frequency being controlled in response to variations in the amplitude of a video signal applied to a line 101, developed in response to a signal applied to an input terminal 102 from the impedance converter 67. Line 101 is connected through a capacitor 103 to ground and through diodes 104, 105 and 106 to circuit points 107, 108 and 109, and inductor 111 being connected between circuit points 107 and 108, and an inductor 112 being connected between circuit points 108 and 109. Circuit point 107 is connected through a resistor 114 to a voltage supply line 115 connected to ground through a capacitor 116, and is also connected through a capacitor 117 to the base of the transistor 100, which is connected through a resistor 118 to the line 115 and also through a resistor 119 to ground. The collector of the transistor 100 is connected to the circuit point 109 while the emitter thereof is connected to ground through the parallel combination of a capacitor 121 and a resistor 122.

In operation, the inductors 111 and 112 together with the diodes 104, 105 and 106 operate as a variable time-delay circuit, controlled in response to the voltage applied to line 101, with a feedback loop formed by capacitors 116 and 117, together with resistors 114 and 118, to cause oscillation of the circuit at a frequency determined by the voltage applied to the line 101.

Line 115 is connected through an inductor 123 to a line 124 which is connected through a resistor 125 to a voltage supply terminal 126, and also through regulating diodes 127 and 128 to ground.

To develop the video signal on the line 101 in response to a signal applied to the input terminal 102, a transistor 130 is provided having a base electrode connected to terminal 102, a collector electrode connected to ground through a resistor 131, and an emitter electrode connected through a resistor 132 to the voltage supply terminal 126. An amplified signal is thus developed at the emitter of the transistor 130 which is applied through a capacitor 133 to the line 101.

An important feature is in the provision of a clamping circuit generally designated by reference numeral 136 for fixing the level of voltage at the line 101 during the horizontal synchronizing pulse intervals. In this circuit, the line 101 is connected through an inductor 137 to a circuit point 138 connected through oppositely poled diodes 139 and 140 to lines 141 and 142 connected together through a resistor 143 and connected to a circuit point 144 through oppositely poled diodes 145 and 146. Circuit point 144 is connected to ground through a capacitor 147 and is also connected to the movable contact of a potentiometer 148 connected at one end to ground and at its other end through a resistor 149 to the power supply terminal 126, a regulating diode 150 being connected in parallel with the potentiometer 148.

With this circuit, a regulated voltage is developed at the circuit point 144, the value thereof being adjustable by adjustment of the potentiometer 148. Lines 141 and 142 are respectively connected to the output of the preamplifier 70 and the output of the phase inverter 72 (FIGURE 9) so that horizontal synchronizing pulses of opposite polarities are applied thereto. When such pulses are applied, all of the diodes 139, 140, 145 and 146 are rendered conductive and the potential of the circuit point 138 is then fixed at that of the circuit point 144. The potential of the line 101 is then fixed at substantially the same value, to fix the frequency of the oscillator at a certain value. At the same time, the capacitor 133 is charged at a certain level, such that the video signal is thereafter applied against a reference level determined by the horizontal synchronizing pulse level. Thus a DC restoration operation is performed along with the frequency-fixing operation.

A frequency modulated output signal is developed at the circuit point 108 which is connected through a line 152 to the input of the trap circuit 74. The trap circuit 74 comprises a transistor 154 having a base electrode connected through a capacitor 155 to the line 152, through a resistor 156 to ground, and through a resistor 157 to a line 158 connected through a capacitor 159 to ground and connected to a choke 160 to the power supply terminal 126. The emitter of the transistor 154 is connected through a choke 161 and through the parallel combination of a resistor 162 and a capacitor 163 to ground. The collector of the transistor 154 is connected through a resistor 164 to the line 158 and through a coupling capacitor 165 to a circuit point 166 which is connected through the primary 167 of a transformer 168 to a circuit point 169. A capacitor 170 is connected in parallel with the primary 167 to tune the primary to resonance at approximately the center frequency of the desired band of frequencies to be passed, and a resistor 171 is also connected in parallel to obtain the desired breadth of pass band.

Circuit point 169 is connected through a secondary winding 172 of the transformer 168 and through a coupling capacitor 173 to the base electrode of a second transistor 174. Circuit point 169 is also connected to a tap of an inductor 175 connected in parallel with a capacitor 176 to form a tuned circuit, with one terminal of the circuit being connected to ground. The tuned or tank circuit so formed is resonant at a frequency range which it is desired to eliminate, such as a frequency range on the order of $f_2$ and higher, to aid in providing a steep cut-off characteristic as illustrated in FIGURE 11(C). At such frequencies, the circuit presents a relatively high impedance minimizing current flow through the transformer primary 167 at such frequencies, and thereby minimizing the signal developed across the transformer secondary 172. At other frequencies, the tank circuit formed by inductor 175 and capacitor 176 presents a low impedance, to permit the transformer 168 to be effective.

The base of the transistor 174 is connected through a resistor 177 to ground and through a resistor 178 to the power supply terminal 126. The emitter of the transistor 174 is connected to ground through a choke 179 and the parallel combination of a capacitor 180 and a resistor 181. The collector of the transistor 174 is connected to the power supply terminal 126 through a resistor 182 and is also connected through a coupling capacitor 183 to a circuit point 184 which is connected through a coupling capacitor 185 to one terminal of a tank circuit formed by an inductor 187 and a capacitor 188, the other terminal thereof being connected to ground. The tank circuit 187, 188 forms a tank circuit for minimizing the transmission of undesired frequency components, and may preferably be tuned to approximately the same frequency as the tank circuit 175, 176.

Circuit point 184 is connected to the base electrode of a transistor 190 in the mixer circuit 75, the base electrode of transistor 190 being additionally connected through a resistor 191 to ground and through a resistor 192 to the power supply terminal 126. The collector of the transistor 190 is connected through a resistor 193 to the power supply terminal 126 and also to an output terminal 194. The emitter of the transistor 190 is connected to ground through a resistor 195 and the parallel combination of a capacitor 196 and a resistor 197. The emitter of transistor 190 is additionally connected through a line 198 to the output of the local oscillator 76. The circuit values are such that the transistor 190 is operated non-linearly, to develop by heterodyne action signal components including difference frequency components which are applied to the amplifier 77 to be recorded as above described.

The local oscillator 76 comprises a transistor 199 connected in a circuit arrangement which is substantially the same as that in the modulator 68, and it is therefore not described in detail.

Figure 13:
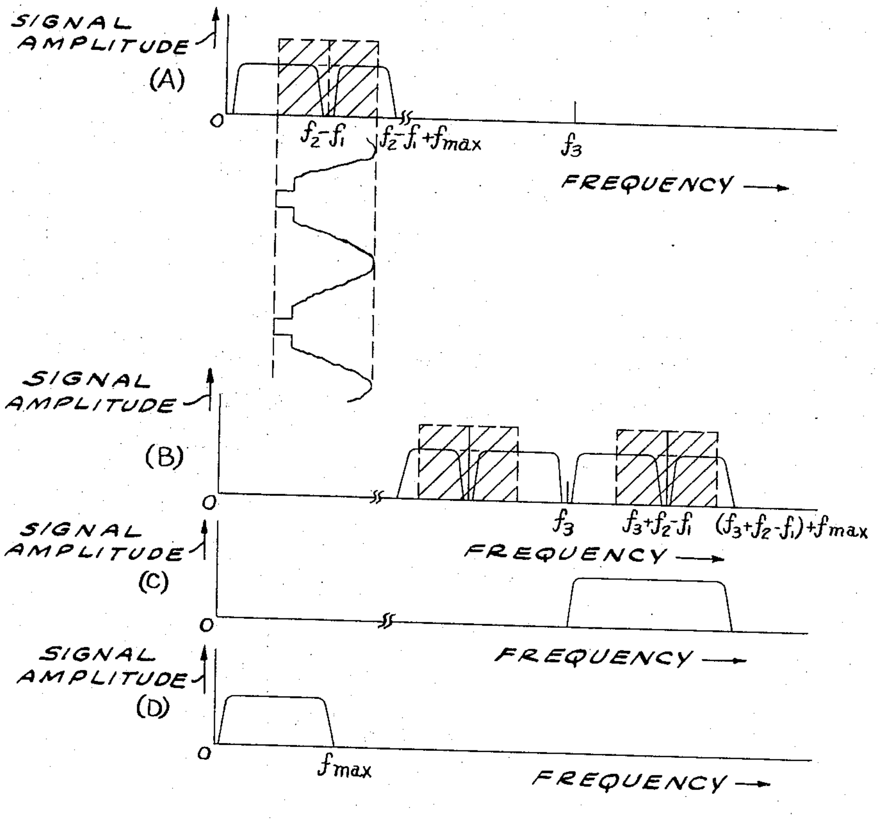
FIGURE 13 illustrates frequency spectrum and frequency response characteristics of signals and circuits in the demodulated portion of the system.

Referring to FIGURE 9, the switches 33 and 34 may be moved to positions opposite the positions as illustrated, to connect the heads 25 and 26 to the inputs of the reproducing amplifiers 45 and 46, the outputs of the amplifiers 45 and 46 being combined in the channel mixer circuit 47. The output of the mixer circuit 47 is applied to a mixer circuit 230 along with a fixed frequency signal from a local oscillator 231. The oscillator 231 is operated at a relatively high frequency, 60 mc. for example. Thus a signal produced at the output of the channel mixer 47, having a frequency spectrum as illustrated in FIGURE 13(A) together with the fixed frequency signal $f_3$ are applied to the mixer 230 to produce at the output of the mixer 230 a signal having a spectrum as illustrated in FIGURE 13(B). This signal is applied to a trap circuit 232 having a frequency response characteristic such as illustrated in FIGURE 13(C), such that only the sum of the fixed frequency $f_3$ and the frequencies of the input signal from the mixer circuit 47 are produced at the output of the trap circuit 232. The output of the trap circuit 232 is applied through a limiter 233 to a discriminator 234 to develop a video signal corresponding to the original input signal applied to the terminal 28, the video signal being applied through an amplifier 235 to the output terminal 49. Thus FIGURE 13(D) illustrates the spectrum of the final output signal.

Figure 12:
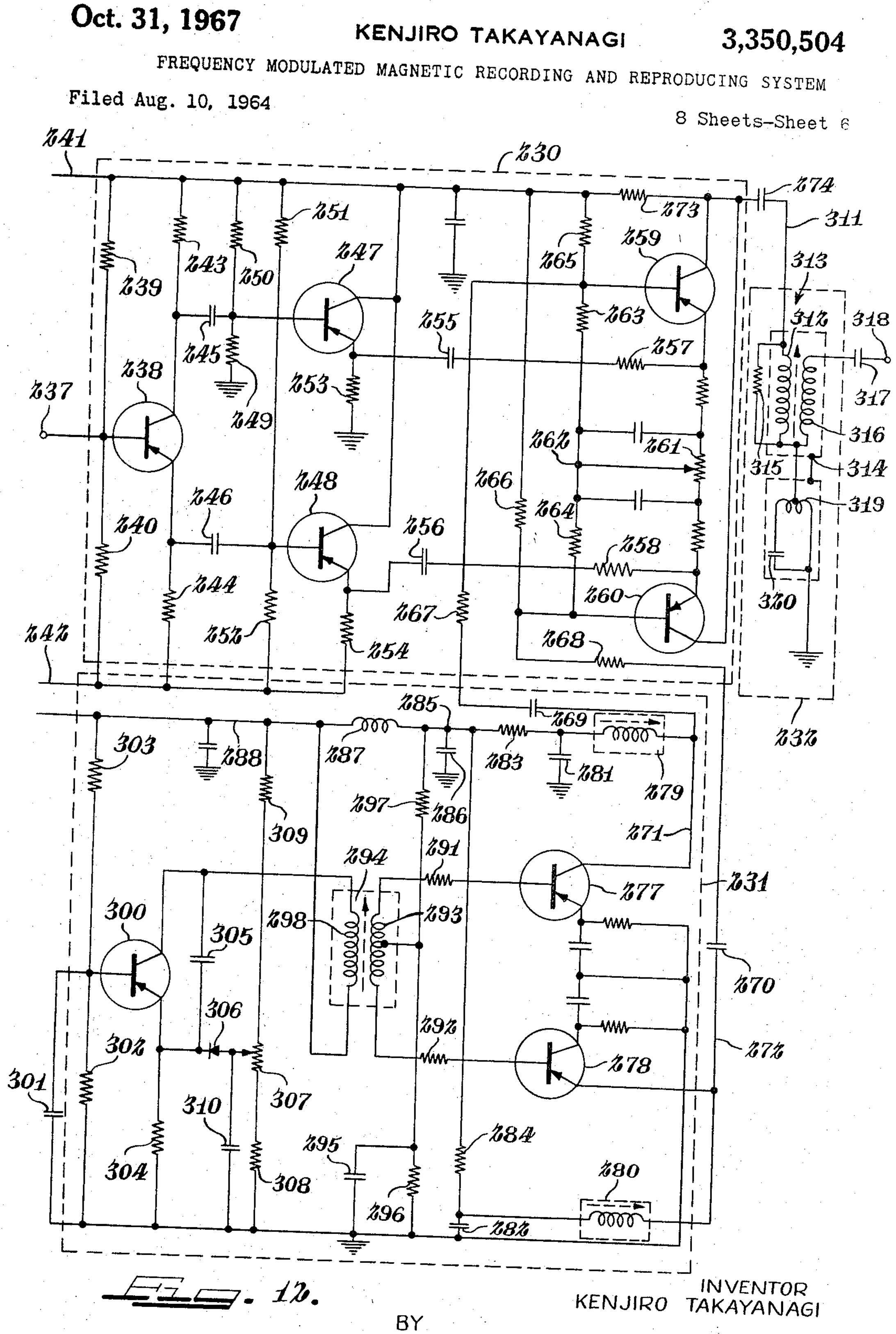
FIGURE 12 is a circuit diagram of a demodulating portion of the system.

FIGURE 12 illustrates the circuits of the mixer 230, the local oscillator 231 and the trap 232. A signal developed by the channel mixer 47 is applied to an input terminal 237 which is connected to the base of a transistor 238 and also through resistors 239 and 240 to positive and negative voltage supply lines 241 and 242.

The transistor 238 operates as a phase-inverter, with the collector and emitter thereof being respectively connected through resistors 243 and 244 to the lines 241 and 242 and also through capacitors 245 and 246 to the base electrodes of a pair of transistors 247 and 248. The base electrode of the transistor 247 is connected through a resistor 249 to ground and through a resistor 250 to the line 241, while the base of the transistor 248 is connected through resistors 251 and 252 to the lines 241 and 242. The collectors of the transistors 247 and 248 are connected together and to the line 241 while the emitters thereof are connected through resistors 253 and 254 to ground and the line 242, respectively. With this arrangement, signals of opposite phase are developed at the emitters of the transistors 247 and 248 which are connected through coupling capacitors 255 and 256 and resistors 257 and 258 to the emitters of a pair of transistors 259 and 260. The emitters of transistors 259 and 260 are connected through resistors to the opposite ends of an adjustable balancing potentiometer having a movable contact connected to a circuit point 262. Circuit point 262 is connected through resistors 263 and 264 to the base electrodes of the transistors 259 and 260, the base electrodes being also connected through resistors 265 and 266 to the line 241 and through resistors 267 and 268 and coupling capacitors 269 and 270 to a pair of output lines 271 and 272 from the local oscillator 231.

Signals of the same frequency but of opposite phase are applied from the local oscillator through the lines 271 and 272 to be applied to the base electrodes of the transistors 259 and 260. The transistors 259 and 260 operate in response to such signals and in response to the oppositely phased signals applied to the emitters thereof from the transistors 247 and 248, to develop a modulated signal having upper and lower side bands, with a frequency spectrum as illustrated in FIGURE 13(B). The output signal is developed at the collectors of the transistors 259 and 260 which are connected together and through a resistor 273 to the line 241, and also through a coupling capacitor 274 to the trap circuit 232.

In the local oscillator circuit 231, the lines 271 and 272 are connected to the collectors of a pair of transistors 277 and 278 and also through variable inductors 279 and 280 to circuit points connected through capacitors 281 and 282 to ground and through resistors 283 and 284 to a circuit point 285 which is connected through a capacitor 286 to ground and through an inductor 287 to a voltage supply line 288. The emitters of the transistors 277 and 278 are connected through parallel resistor and capacitor combinations to ground.

Signals of the same frequency but of opposite phase are applied to the base electrodes of the transistors 277 and 278 to develop corresponding signals at the output lines 271 and 272. By adjustment of the values of the inductors 279 and 280, it is possible to obtain a balance such that the oscillator frequency $f_3$ is suppressed in the output of the mixer 230.

To apply signals of the same frequency but of opposite phase to the base electrodes of the transistors 277 and 278, they are connected through resistors 291 and 292 to the ends of a secondary winding 293 of a transformer 294, having a center tap connected to ground through the parallel combination of a capacitor 295 and a resistors 296, and to the circuit point 285 through a resistor 297.

The transformer 294 has a primary winding 298 connected at one end to the power supply line 288 and connected at its opposite end to the collector of a transistor 300, operated as an oscillator. The base of the transistor 300 is connected through a capacitor 301 and a resistor 302 to ground and through a resistor 303 to the power supply line 288. The emitter of the transistor 300 is connected through a resistor 304 to ground, through a capacitor 305 to the collector thereof, and through a diode 306 to the movable contact of a potentiometer 307 having opposite ends connected through resistors 308 and 309 to ground and the line 288, with a bypass capacitor 310 being connected between the movable contact of potentiometer 307 and ground.

With this circuit arrangement, an oscillator is provided which may be operated at a relatively high frequency, for example 60 mc., and signals of opposite phase at such frequency are applied to the base electrodes of the transistors 277 and 278. The oscillation frequency may be adjusted by adjustment of the potentiomer 307.

The trap circuit 232 comprises an input line 311 connected through a primary winding 312 of a transformer 313 to a circuit point 314, a resistor 315 being connected in parallel to the primary winding 312. The transformer 313 has a secondary winding 316 connected at one end to the circuit point 314 and connected at its opposite end through a coupling capacitor 317 to an output terminal 318.

Circuit point 314 is connected to a tap of an inductor 319 having one end connected through a capacitor 320 to ground and having an opposite end connected directly to ground.

The inductor 319 and capacitor 320 form a tank circuit having a resonant frequency such as to cut off frequencies below a frequency somewhat higher than $f_3$, and the transformer 313 is bifilar wound with characteristics such as to pass a band of frequencies higher than $f_3$, to provide an overall characteristic as indicated in FIGURE 13(C).

Figure 14:
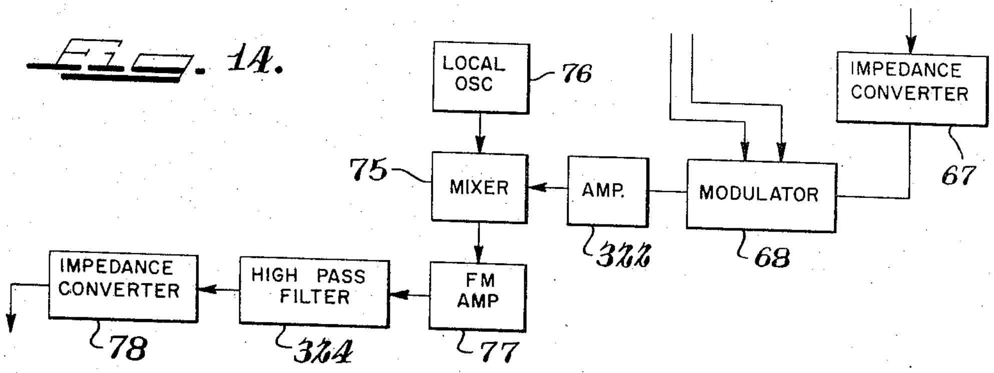
FIGURE 14 is a block diagram illustrating a modification of the modulating portion of the system.

FIGURE 14 illustrates a portion of a modified form of system, which is the same as that illustrated in FIGURE 9, except that the trap circuit 74 is eliminated and replaced by a wide band amplifier 322, while a high pass filter 324 is interposed between the output of the amplifier 77 and the input of the impedance converter 78.

Figure 16:
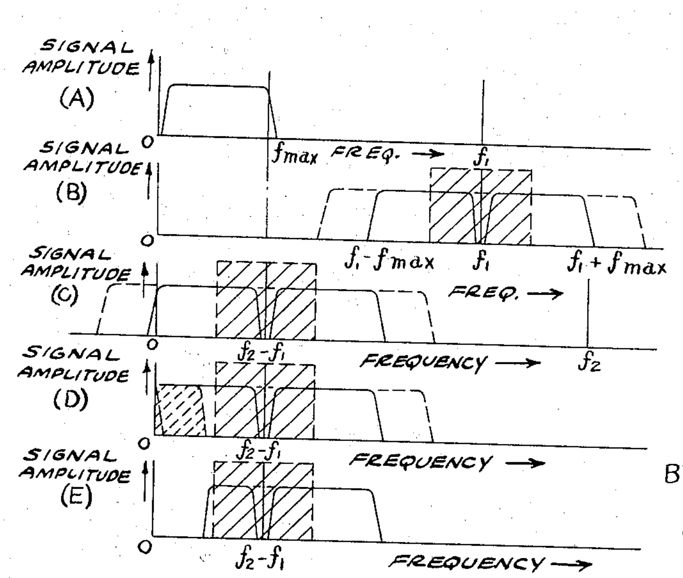
FIGURE 16 illustrates frequency spectrum and frequency response characteristics of signals and circuits of the modified form of system as illustrated in FIGURES 14 and 15.

With trap circuit 74 eliminated, a signal having a frequency spectrum as illustrated in FIGURE 16(B) is applied to the input of the mixer 75, along with the signal at the frequency $f_2$ from the local oscillator 76, to produce an output signal shifted downwardly in frequency, having a center frequency equal to $f_2-f_1$. With $f_2-f_1$ being less than $f_{max}$ (the maximum frequency of the input signal) the resultant output might be represented graphically as illustrated in FIGURE 16(C). However, the actual result is as illustrated in FIGURE 16(D) wherein the higher frequency components of the signal applied to the mixer 75 from the amplifier 322 beat with the signal at frequency $f_2$ from the local oscillator 76, to produce lower frequency components, thereby resulting in a "folded-back" portion, as indicated by broken line hatchings in FIGURE 16(D).

The high pass filter 324 operates to remove the portion of the signal output in the range of the folded-back portion so generated, to produce an output signal having a frequency spectrum as shown in FIGURE 16(E). When a signal of this form is demodulated, the result is a high fidelity reproduction of the original input signal.

Figure 15:
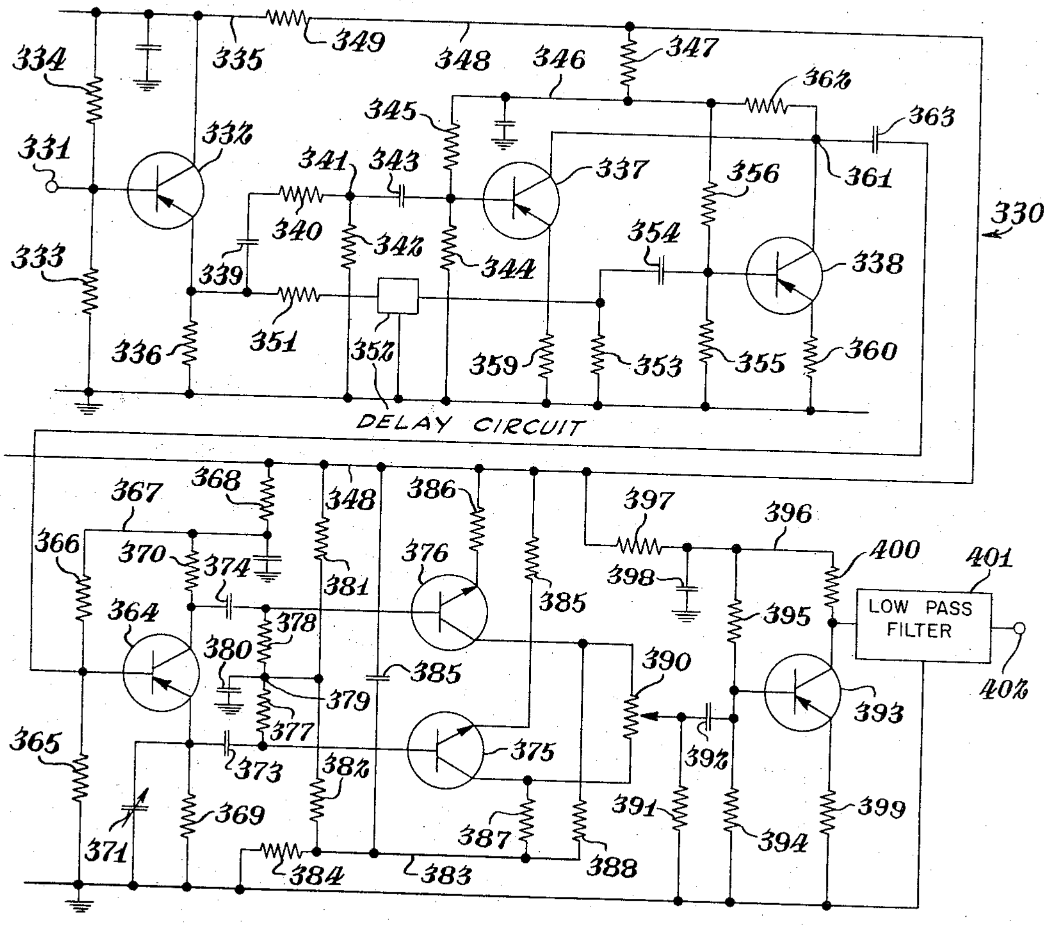
FIGURE 15 is a circuit diagram of a modified form of demodulating portion of the system, usable with the modified modulator portion illustrated in FIGURE 14.

The signal so generated with the modified system if FIGURE 14 may be demodulated by the same system as illustrated in FIGURES 9 and 12, or may be demodulated with a modified circuit 330 shown in FIGURE 15, wherein no heterodyne operation is used.

In the circuit 330, a reproduced signal is applied to an input terminal 331 which is connected to the base of a transistor 332, and also through a resistor 333 to ground and through a resistor 334 to a power supply line 335. The transistor 332 is operated as an emitter-follower, the collector thereof being connected to the power supply line 335, and the emitter thereof being connected through a resistor 336 to ground.

The signal developed at the emitter of transistor 332 is applied through separate circuits to the base electrodes of transistors 337 and 338, in a manner such that the signals on the base electrodes of transistors 337 and 338 are in 180-degree phase relation. In particular, the emitter of the transistor 332 is connected through a capacitor 339 and a resistor 340 to a circuit point 341 connected to ground through a resistor 342 and connected through a capacitor 343 to the base of the transistor 337, and additionally through a resistor 344 to ground and through a resistor 345 to a line 346 connected through a resistor 347 to a power supply line 348 which is connected to the line 335 through a resistor 349.

The emitter of transistor 332 is also connected through a resistor 351 to an input terminal of a delay network 352 having an output terminal connected through a resistor 353 to ground and through a capacitor 354 to the base of the transistor 338, the base of transistor 338 being connected through a resistor 355 to ground and through a resistor 356 to the line 346. The delay circuit 352 and the values of the other components are such as to provide the 180 degree phase difference of signals applied to the base electrodes of the transistors 337 and 338.

The emitters of the transistors 337 and 338 are connected through resistors 359 and 360 to ground, while the collectors thereof are both connected directly to a circuit point 361 which is connected through a resistor 362 to the line 346.

In operation, with the frequency modulated signal being applied in 180-degree phase relation to the base electrodes of the transistors 337 and 338, and with such signals being superimposed through the common collector circuit, the frequency modulated signal is discriminated and a corresponding amplitude modulated signal is produced at the circuit point 361.

Circuit point 361 is connected through a coupling capacitor 363 to the base of a transistor 364 and also through a resistor 365 to ground and through a resistor 366 to a line 367 connected through a resistor 368 to the power supply line 348. Transistor 364 is operated as a phase-splitter with the emitter and collector thereof being connected through resistors 369 and 370 to ground and the line 367, respectively. A variable capacitor 371 is connected across the resistor 369, for balance adjustment.

The emitter and collector of the transistor 364 and respectively connected through coupling capacitors 373 and 374 to the base electrodes of a pair of transistors 375 and 376, such base electrodes being additionally connected through resistors 377 and 378 to a circuit point 379. Circuit point 379 is connected through a capacitor 380 to ground, through a resistor 381 to the line 348 and through a resistor 382 to a line 383 which is connected through a resistor 384 to ground and through a capacitor 385 to the line 348.

The emitters of the transistors 375 and 376 are connected through resistors 385 and 386 to the line 348, while the collectors thereof are connected through resistors 387 and 388 to the line 383, and also to the opposite ends of a potentiometer 390.

In operation, amplitude modulated signals in 180 degree phase relation are applied to the base electrodes of the transistors 375 and 376, and a bias potential is applied from circuit point 379 of a value such that the transistors 375 and 376 effectively operate as a full-wave rectifier, an output signal being developed at the movable contact of the potentiometer 390, which may be adjusted for balance. Such full-wave rectification or detection is important in that the frequency of fluctuations in the output is twice that which it would be with half-wave detection, and is higher than the highest frequency of the video signal band, which avoids interference effects such as dots or the like, which are obtained with half-wave detection.

The movable contact of the potentiometer 390 is connected through a resistor 391 to ground and through a capacitor 392 to the base of an amplifying transistor 393, the base being connected through a resistor 394 to ground and through a resistor 395 to a line 396, connected through a resistor 397 to the line 348 and through a bypass capacitor 398 to ground. The emitter of the transistor 393 is connected through a transistor 399 to ground, while the collector thereof is connected through a resistor 400 to the line 396 and also to the input of a low pass filter 401 having an output connected to an output terminal 402. The filter circuit 401 is arranged to attenuate frequencies above the highest video frequency to be reproduced.

The reproducing circuit 330 of FIGURE 15 thus operates to demodulate the reproduced signal, without heterodyning. The circuit is highly advantageous when used in combination with the modification of FIGURE 14.

It will be understood that modifications and variations may be effected without departing from the spirit and scope of the novel concepts of this invention.

I claim as my invention:

1. In a signal translating system, means for supplying a frequency modulated carrier signal varying in frequency between lower and upper frequency limits, means for converting said frequency modulated carrier signal to an amplitude modulated signal, and detector means responsive to said amplitude modulated signal for producing an output signal having amplitude limits respectively corresponding to said frequency limits and having a maximum frequency higher than said lower frequency limit of said frequency modulated carrier signal.

2. In a signal translating system as defined in claim 1, said detector means including a full wave detector having a frequency doubling action to produce a ripple component at a frequency approximately equal to the sum of said lower and upper frequency limits, and low pass filter means for suppressing said ripple component.

3. In a signal translating system, means for supplying a frequency modulated carrier signal varying in frequency between lower and upper frequency limits respectively corresponding to amplitude limits of a signal to be reproduced with said lower frequency limit being less than the maximum frequency of the signal to be reproduced, high pass filter means for suppressing interference components otherwise present in the lower end portion of the lower side band of said frequency modulated carrier signal with said lower frequency limit being less than said maximum frequency, means for converting said frequency modulated carrier signal into an amplitude modulated signal, and detector means responsive to said amplitude modulated signal for producing an output signal.

4. In a system for translating a television signal having an amplitude varying between a first limit defined by synchronizing pulses and a second limit corresponding to maximum video information and having a frequency range extending to a certain maximum frequency, modulator means responsive to said input signal for producing a first frequency modulated carrier signal having a center frequency substantially higher than said certain maximum frequency, means for generating a signal at a fixed frequency differing from said center frequency by a frequency less than the sum of said certain maximum frequency and the maximum deviation of said carrier frequency away from said center frequency, mixer means responsive to said first frequency modulated carrier signal and said fixed frequency signal for producing a second frequency modulated carrier signal varying in frequency between lower and upper frequency limits corresponding to said amplitude limits of said television signal, a signal transmission channel, means for applying said second frequency modulated carrier signal to said signal transmission channel, and level fixing means for fixing the output frequency of said modulator means during synchronizing pulse intervals.

5. In a system as defined in claim 4, said level fixing means comprising synchronizing pulse separator means for producing control pulses during synchronizing pulse intervals, and driven clamp means controlled by said control pulses for fixing the level of signal applied to said modulator means.

6. In a system as defined in claim 4, said level fixing means comprising an interstage coupling capacitor, and diode means driven into conduction by synchronizing pulses for fixing the level of charge of said interstage coupling capacitor.

7. In a system for translating an input signal having an amplitude varying between predetermined limits and having a frequency range extending from a relatively low frequency to a certain maximum frequency, modulator means responsive to said input signal for producing a frequency modulated carrier signal varying in frequency between lower and upper frequency limits respectively corresponding to said predetermined amplitude limits of said input signal, said lower frequency limit being less than said certain maximum frequency of said input signal frequency range, a signal transmission channel, said signal transmission channel having a frequency response characteristic with a maximum frequency at least as high as said upper frequency limit of said carrier signal, means for applying said frequency modulated carrier signal to said transmission channel, and level fixing means for fixing the output frequency of said modulator means during synchronizing pulse intervals.

8. In a system for translating a television signal having an amplitude varying between a first limit defined by synchronizing pulses and a second limit corresponding to maximum video information and having a frequency range extending to a certain maximum frequency, modulator means responsive to said television signal for producing a frequency modulated carrier signal varying in frequency between lower and upper frequency limits respectively corresponding to said first and second amplitude limits, said lower frequency limit being less than certain maximum frequency, a signal transmission channel, said signal transmission channel having a frequency response characteristic with a maximum frequency at least as high as said upper frequency limit of said carrier signal, means for applying said frequency modulated carrier signal to said transmission channel, and level fixing means for fixing the output frequency of said modulator means during synchronizing pulse intervals.

9. In a magnetic recording system for recording television video signals or any other wide-band signals on a magnetic medium, oscillator means producing a first signal at a first frequency and including a transistor, modulator means for modulating the frequency of said oscillator means and including diode means in circuit with said transistor, amplifier means for applying an amplified input signal to said diode means to vary the effective reactance thereof and to control the frequency of operation of said oscillator means to produce a first frequency modulated carrier signal, said input signal having a frequency range extending from a relatively low frequency to a certain maximum frequency with said first frequency being substantially higher than said certain maximum frequency, means for generating a second signal at a second frequency less than the sum of said certain maximum frequency and the maximum deviation of the frequency of said first frequency modulated carrier away from said first frequency, mixer means responsive to said first frequency modulated carrier signal and said second signal to produce by heterodyne action a second frequency modulated carrier signal having a center frequency substantially equal to or lower than said certain maximum frequency, and magnetic recording means operative to record said second frequency modulated signal on a magnetic medium, said magnetic recording means having a frequency response characteristic with a maximum frequency at least as high as the upper frequency limit of said second frequency modulated carrier signal.

10. In a magnetic recording system, as defined in claim 9, level fixing means for fixing the voltage applied to said diode means during synchronizing pulse intervals.

11. In a magnetic recording system, as defined in claim 10, said level fixing means comprising synchronizing pulse separator means for producing control pulses during synchronizing pulse intervals, and driven clamp means controlled by said control pulses for fixing the level of signal applied to said modulator means.

12. In a magnetic recording system, as defined in claim 11, said level fixing means comprising an interstage coupling capacitor, and diode means driven into conduction by synchronizing pulses for fixing the level of charge of said interstage coupling capacitor.

References Cited

UNITED STATES PATENTS

| | | | |
|---|---|---|---|
| 2,956,114 | 10/1960 | Ginsburg | 178—6.6 |
| 3,040,125 | 6/1962 | Dillenburger | 178—6.6 |
| 3,258,694 | 6/1966 | Shepherd | 325—145 |

JOHN W. CALDWELL, *Acting Primary Examiner.*

DAVID G. REDINBAUGH, *Examiner.*

H. W. BRITTON, *Assistant Examiner.*